March 18, 1969 J. A. REID 3,433,578
BIOCIDAL WASHING COMPOSITION AND METHOD
Filed Oct. 8, 1963
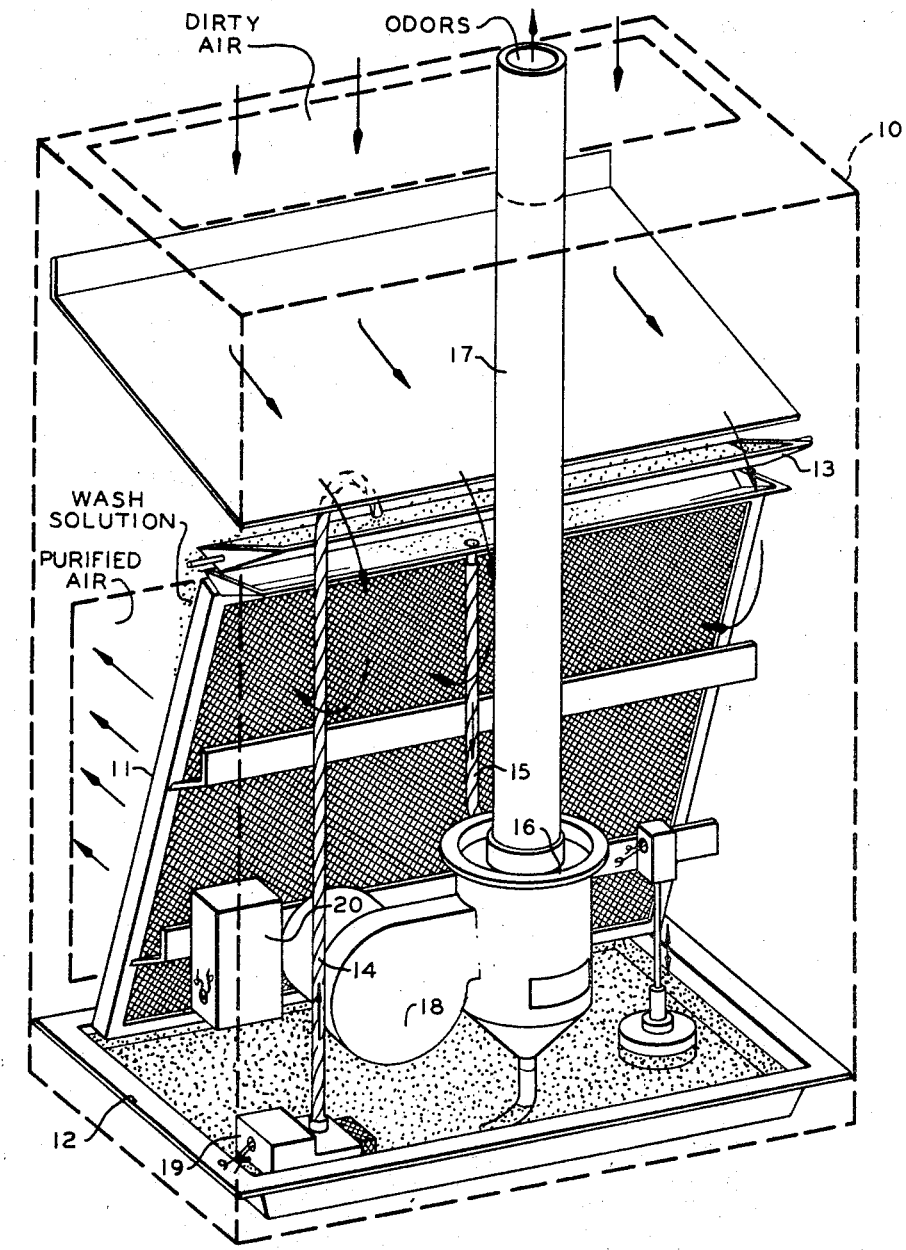
INVENTOR.
J.A. REID
BY *Young & Quigg*
ATTORNEYS

United States Patent Office 3,433,578
Patented Mar. 18, 1969

3,433,578
BIOCIDAL WASHING COMPOSITION
AND METHOD
James A. Reid, Bartlesville, Okla., assignor to Phillips
Petroleum Company, a corporation of Delaware
Filed Oct. 8, 1963, Ser. No. 314,667
U.S. Cl. 21—53    8 Claims
Int. Cl. A61l 9/00; A61k 27/00

ABSTRACT OF THE DISCLOSURE

A biocidal composition, and a method for washing filters and air purification systems utilizing said composition, consisting of a major portion of water and a minor portion of a blend of a polyhydroxy alcohol and a glycol ether.

---

This invention relates to a novel composition which has biocidal properties and is useful in washing filters, containers, fluid streams, etc. In another aspect it relates to an improved method for removing impurities and contaminants from air heating and cooling systems.

In many hospitals, offices, and residences, air filtering and humidifying has become an important part of the control of air quality. In many such installations arrangements are made for the air to pass through a filter made up of expanded metal, coarse fiberglass, excelsior or other porous material, over which a wash solution is intermittently or continuously passed. In such systems it has been observed that dust, insects and other foreign bodies accumulate. These are, however, normally washed by the wash solution into a reservoir from which they can be mechanically separated and removed. The instant invention relates to compositions and methods of improving the continued efficiency of air filter systems.

It has been observed that, in addition to the accumulation of solid particles such as dust, insects, etc., washed from the air, bacteria, fungus, and molds are also collected in the wash solution. During the winter months particularly, in some installations, water is added to the wash solution in such quantity as to maintain the desired partial pressure of water and thus the desired humidity in the atmosphere washed by the air conditioning unit. Under these conditions the wash solution permits the growth and proliferation of micro-organisms, particularly molds and fungus, with the result that the desired removal of these materitals from the air system is not accomplished but may in some case be aggravated.

Accordingly, the present invention relates to novel compositions which have biocidal properties and to an improved method of removing impurities and contaminants from fluid filtering systems, especially air filter systems.

An object of this invention is to provide a novel composition having biocidal properties.

A further object of this invention is to provide an improved method of removing impurities and contaminants including microorganisms from fluid heating and cooling systems.

Other objects and aspects as well as the several advantages of the invention will be apparent upon a further study of the specification, the drawing and the appended claims.

Accordingly, I have now discovered compositions which have biocidal properties and which can be used to advantage in washing filters, containers, fluid streams, air purification systems, and the like. Briefly, my biocidal composition comprises a major proportion of a fluid or liquid such as water and a minor proportion of a biocidal agent consisting of a blend of (a) at least one polyhydroxy alcohol containing from 2 to 22 carbon atoms and from 2 to 5 OH groups wherein each OH is attached to different carbon atoms, and (b) at least one glycol ether having the formula $$R(OCH_2CH_2)_xOH$$

wherein R is selected from the group consisting of hydrogen, methyl, ethyl, propyl, butyl, phenyl and tolyl groups, and $x$ is an integer, with the provisos that when R is hydrogen $x$ is an integer of from 2 to 4, and when R is other than hydrogen $x$ is an integer of from 1 to 4. A preferred biodical blend comprises a mixture of ethylene glycol and a glycol ether such as methyl ether of diethylene glycol.

Representative examples of suitable glycol ethers that can be incorporated in the wash solutions of the invention as the major component of the biocidal blend include: methyl ether of ethylene glycol (methyl Cellosolve); ethyl ether of ethylene glycol (ethyl Cellosolve); butyl ether of ethylene glycol (butyl Cellosolve); methyl ether of diethylene glycol (methyl Carbitol); ethyl ether of diethylene glycol (ethyl Carbitol); butyl ether of diethylene glycol (butyl Carbitol); methyl ether of triethylene glycol; ethyl ether of triethylene glycol, phenyl ether of ethylene glycol; tolyl ether of ethylene glycol; phenyl ether of diethylene glycol; tolyl ether of diethylene glycol; phenyl ether of triethylene glycol; tolyl ether of triethylene glycol; diethylene glycol; triethylene glycol; tetraethylene glycol; and the like, including mixtures thereof. A presently preferred group of glycol ethers suitable for use in the practice of this invention are those having the above general formula where R is methyl, ethyl, propyl, or butyl, and $x$ is an integer of from 1 to 4. The most preferred glycol ethers are those of the above general formula where R is methyl or ethyl and $x$ is 1 or 2, especially ethylene glycol monoethyl ether.

Representative examples of polyhydroxy alcohols that can be used as the minor component according to the invention include the polyethylene glycols having molecular weights preferably ranging from 200 to 700 and having the formula $$HOCH_2(CH_2OCH_2)_xCH_2OH$$

wherein $x$ ranges from 0 to 10 such as: diethylene glycol; triethylene glycol; tetraethylene glyol; pentaethylene glycol; decaethylene glycol; dipropylene glycol, and the like including mixtures thereof. Other polyhydroxy alcohols that can be used include ethylene glycol; 1,2-dihydroxypropane; 1,3-dihydroxypropane; glycerol; 1,2,3-trihydroxybutane; 1,2,4-trihydroxybutane; 2-(hydroxymethyl)-1,3-dihydroxypropane; erythritol; pentaerythritol; 1,2,3,4-tetrahydroxypentane, 1,2,3,5-tetrahydroxypentane; 1,2,4,5-tetrahydroxypentane; 2-(hydroxymethyl)-1,3,4-trihydroxybutane; 1,2,3,4,5 - pentahydroxypentane, and the like, including mixtures thereof.

Representative combinations of ethylene glycol and glycol ethers that can be used as two component biocidal agents according to this invention include: ethylene glycol and methyl ether of diethylene glycol (methyl Carbitol), ethylene glycol and methyl ether of ethylene glycol (methyl Cellosolve), and the like. Where such a two component biocidal agent or blend is used, ethylene glycol or other polyhydroxy alcohol is usually present in a minor component of the blend. Ordinarily, however, a multi-component biocidal blend composed of from 1 to 25 volume percent of at least one polyhydroxy alcohol, e.g., ethylene glycol, and from 99 to 75 volume percent of at least one glycol ether, as defined, is preferred and has been found to be significantly better as a bactericide or biocidal agent than either of the two materials alone. The agents of the invention in addition to being biocidal in activity also reduce corrosion and it is intended that my invention cover corrosion inhibition and other beneficial effects which may occur during its use in addition to the biocidal effects.

The amount of biocidal agent used in preparing the biocidal compositions of this invention will be, stated functionally, an amount sufficient to render the solution biocidal (or antimicrobial), that is, the biocidal agent is used in an amount such as to destroy, or at least prevent or minimize the growth or multiplication of microorganisms which are present in systems contacted by the wash solution of the invention or which are present in the wash solution or wherever the wash solution is placed for the purpose of washing fluids, containers, filters, etc. The optimum concentration of biocidal agent will, of course, vary with the nature of the individual components of the agent and again in some instances be dependent upon the degree of infection by the microorganisms or the population thereof. The exact identity of these microorganisms is often difficult to ascertain and, therefore, the invention is not limited to any specific scientific class of microorganism. Generally speaking, in most applications the biocidal compositions, preferably aqueous compositions, of this invention will contain the biocidal agent in an amount ranging from about 7.5 to about 30 volume percent, preferably from about 10 to about 25 volume percent of the biocidal wash solution. From a practical standpoint and for other important reasons, the often preferred upper limit of antimicrobial agent is at least 50 percent and more preferably 100 percent higher than the lower limit which gives biocidity. Thus, in the case of a mixture of methyl Cellosolve and ethylene glycol, for example, assuming 15 volume percent in the aqueous phase is biocidal, the upper preferred limit would be 30 volume percent.

A better understanding of this invention will be obtained upon reference to the following illustrative drawing which diagrammatically illustrates an air purification system utilizing an aqueous biocidal wash solution according to the invention. The air purification system illustrated in the drawing is used in connection with a home-heating and air conditioning system.

Referring now to the drawing, the air purifier is comprised of a housing 10 which contains a porous filter element 11, a wash solution collecting pan 12 at the base of housing 10, and a regenerator unit 16 for removing odors from the wash solution. Located in the collecting pan 12 is a circulating pump 19 which forces the wash solution up through pipe or conduit 14 and dumps the solution onto distributing tray 13 positioned above filter element 11. A portion of the wash solution discharged into tray 13 passes downwardly over filter element 11 to wash impurities collected on the filter element into pan 12. The remainder of the wash solution passes by way of line 15 to regenerator 16. Heat is introduced into regenerator 16 by heater unit 18 to drive off odorous materials from the wash solution in regenerator 16 through outlet pipe or stack 17. Additional water can be added to collecting pan 12 through a humidity control unit 20.

Air, either recirculated air or outside air, enters purifier 10 as indicated by the arrows and is passed through filter element 11 which is being washed with a wash solution which washes dust, pollen, and other harmful airborn elements collected on the filter into collection pan 12. The dirt and other impurities collected in collecting pan 12 can be cleaned out as required periodically.

In accordance with the invention, an aqueous wash solution comprising principally water containing a minor proportion of a blend of ethylene glycol and an ethylene glycol ether is used to remove deposited impurities from filter element 11 as well as control microbiological growth in the air purification system. The aqueous wash solution can contain from about 10 to about 30 volume percent of the ethylene glycol-ethylene glycol ether mixture. The wash solution is continuously circulated over the filter and back to the collecting pan and with a portion being continuously regenerated for odor removal in regenerator 16. The wash solution used according to the invention contains a blend composed of about 10 to about 25 volume percent ethylene glycol and from 90 to about 75 volume percent glycol ether. It has been found that such a composition is very effective as a bactericide for controlling microorganisms. The aqueous wash solution can contain other additives, if desired, that do not inhibit the biocidal action of the agents of the invention.

The above-described air purification unit employing the novel biocidal composition of the invention has utility in many applications and particularly for residential and commercial heating and air conditioning systems since the system constantly cleans air and removes odors, microorganisms, etc., in all seasons. Moreover, the system adds moisture to dry indoor air in the winter. Also, in view of the self-cleaning and regeneration features of the air purification system the air purifier as well as the wash solution retains its full efficiency at all times.

As an example of this invention, an aqueous wash liquid containing 10 volume percent of a blend made up of 10 volume percent ethylene glycol and 90 volume percent methyl ether of ethylene glycol is employed as the wash solution for the air purifier illustrated in the drawing employed in a home air conditioning system. As the air passes through filter element 11, dirt and other impurities entrained in the air are retained by the filter. The wash solution passing over the filter carries the impurities to the collecting pan. The wash solution is continuously circulated over the filter element and back to the collecting pan. It has been found that the use of the above biocidal composition in the air purifier as described reduces corrosion and controls the growth or proliferation of microorganisms in the air purification system.

Various modifications and alterations of this invention will become apparent to those skilled in the art from the foregoing discussion and it should be understood that this invention is not to be limited unduly to that set forth herein for illustrative purposes.

That which is claimed is:

1. An aqueous biocidal composition consisting essentially of a major portion of water and a minor proportion of biocidal agent consisting of a blend of ethylene glycol and a glycol ether.

2. The composition of claim 1 wherein the amount of biocidal agent is in the range of 7.5 to 30 volume percent of said biocidal composition.

3. The composition of claim 1 wherein said glycol ether has the general formula $$R(OCH_2CH_2)_xOH$$

wherein R is selected from the group consisting of hydrogen, methyl, ethyl, propyl, butyl, phenyl and tolyl groups, and $x$ is an integer, with the provisos that when R is hydrogen $x$ is an integer of from 2 to 4, and when R is other than hydrogen $x$ is an integer of from 1 to 4.

4. An aqueous wash composition consisting essentially of water and from 10 to 30 volume percent of a biocidal agent consisting of a blend of (a) a polyhydroxy alcohol containing from 2 to 22 carbon atoms and from 2 to 5 OH groups wherein each OH is attached to a different carbon atom and (b) a glycol ether having the general formula $$R(OCH_2CH_2)_xOH$$

wherein R is selected from the group consisting of hydrogen, methyl, ethyl, propyl, butyl, phenyl and tolyl groups, and $x$ is an integer, with the provisos that when R is hydrogen $x$ is an integer of from 2 to 4, and when R is other than hydrogen $x$ is an integer of from 1 to 4.

5. The composition of claim 4 wherein said blend consists essentially of 1 to 25 volume percent of (a) and from 99 to 75 volume percent of (b).

6. The composition of claim 5 wherein (a) is ethylene glycol and (b) is monomethyl ether of ethylene glycol.

7. In a method of operating an air heating and cooling system which encounters formation and accumulation of foreign bodies including bacteria, fungus, and the like, said system being equipped with a filter through which air passes and over which a filter wash solution is circulated to remove said foreign bodies, the step of circulating over said filter an aqueous biocidal composition consisting essentially of a major portion of water and from 7.5 to 30 volume percent of a biocidal agent consisting of a blend of (a) a polyhydroxy alcohol containing from 2 to 22 carbon atoms and from 2 to 5 OH groups wherein each OH is attached to a different carbon atom and (b) a glycol ether having the general formula $$R(OCH_2CH_2)_xOH$$

wherein R is selected from the group consisting of hydrogen, methyl, ethyl, propyl, butyl, phenyl and tolyl groups, and $x$ is an integer, with the provisos that when R is hydrogen $x$ is an integer of from 2 to 4, and when R is other than hydrogen $x$ is an integer of from 1 to 4, the amount of (a) ranging from 1 to 25 volume percent and (b) ranging from 99 to 75 volume percent of said blend.

8. In a method of operating an air heating and cooling system which encounters formation and accumulation of foreign bodies including bacteria, fungus, and the like, said system being equipped with a filter through which air passes and over which a biocidal filter wash solution is circulated to remove said foreign bodies, the step of circulating over said filter an aqueous biocidal wash composition consisting essentially of water and from 10 to 25 volume percent of a biocidal agent consisting of a blend of (a) ethylene glycol and (b) monomethyl ether of ethylene glycol, the amount of (a) in the blend ranging from 1 to 25 volume percent and (b) ranging from 99 to 75 volume percent.

References Cited

UNITED STATES PATENTS

| | | | |
|---|---|---|---|
| 2,677,630 | 5/1954 | Scales | 21—58 |
| 3,169,905 | 2/1965 | Lambert | 21—58 |
| 2,333,124 | 11/1943 | Robertson et al. | 167—22 |
| 2,595,673 | 6/1952 | Grosvenor et al. | 21—53 |
| 3,126,428 | 3/1964 | Ash | 21—53 |

FOREIGN PATENTS 769,952  3/1957  Great Britain.

MORRIS O. WOLK, *Primary Examiner.*

BARRY S. RICHMAN, *Assistant Examiner.*

U.S. Cl. X.R.

21—58, 2.7; 252—106; 424—342